(12) United States Patent
Moore

(10) Patent No.: US 9,920,845 B2
(45) Date of Patent: Mar. 20, 2018

(54) CONTROL VALVE

(71) Applicant: DELPHI TECHNOLOGIES IP LIMITED, St. Michael (BB)

(72) Inventor: Wayne R. Moore, Goodrich, MI (US)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 18 days.

(21) Appl. No.: 14/824,239

(22) Filed: Aug. 12, 2015

(65) Prior Publication Data

US 2017/0045148 A1 Feb. 16, 2017

(51) Int. Cl.
*F16K 11/052* (2006.01)

(52) U.S. Cl.
CPC ............................... *F16K 11/0525* (2013.01)

(58) Field of Classification Search
USPC ............................................. 137/625.44, 875
See application file for complete search history.

(56) References Cited

U.S. PATENT DOCUMENTS

| | | | | |
|---|---|---|---|---|
| 1,699,429 A | * | 1/1929 | Hall ......................... | F02M 1/00 123/325 |
| 2,999,640 A | * | 9/1961 | Waterfill ............... | F24F 3/0522 137/494 |
| 3,513,817 A | * | 5/1970 | Kearsley ................ | F02M 31/06 123/552 |
| 3,521,659 A | * | 7/1970 | Seger .................... | F16K 15/033 137/112 |
| 4,156,439 A | * | 5/1979 | Jeffries ............... | F16K 11/0525 137/625.46 |
| 4,281,686 A | * | 8/1981 | Gerlitz ............... | B60H 1/00314 137/625.46 |
| 5,142,868 A | | 9/1992 | Woon et al. | |
| 5,531,248 A | | 7/1996 | Pearson et al. | |
| 6,484,703 B1 | | 11/2002 | Bailey | |
| 6,648,018 B2 | * | 11/2003 | Gagnon ................ | F16K 11/052 137/875 |
| 7,600,380 B2 | * | 10/2009 | Grissom ............... | F02B 37/007 137/625.44 |
| 7,849,805 B2 | | 12/2010 | Brüggemann et al. | |
| 8,162,004 B2 | * | 4/2012 | Albert ................. | F16K 11/0525 137/340 |
| 8,479,714 B2 | | 7/2013 | Albert et al. | |
| 8,535,051 B2 | * | 9/2013 | Greco ................. | F16K 11/0525 137/625.43 |
| 2008/0302991 A1 | | 12/2008 | Tseng | |
| 2009/0007978 A1 | | 1/2009 | Alston et al. | |
| 2013/0276892 A1 | | 10/2013 | Kamp et al. | |

* cited by examiner

*Primary Examiner* — John Fox
(74) *Attorney, Agent, or Firm* — Joshua M. Haines

(57) ABSTRACT

A control valve includes a first conduit having a first inlet and a first outlet and defining a first passage; a second conduit having a second inlet and a second outlet and defining a second passage, the second conduit extending into the first passage such that the second inlet is located within the first passage; and a valve plate disposed pivotably within the first passage, the valve plate defining a valve plate surface. Pivoting of the valve plate within the first passage varies flow from the first inlet to the first outlet and the valve plate is pivotal between a first position and a second position such that in the first position the valve plate substantially prevents fluid communication between the first passage and the second passage and such that in the second position the valve plate permits fluid communication between the first passage and the second passage.

2 Claims, 6 Drawing Sheets

CONTROL VALVE

STATEMENT REGARDING FEDERALLY SPONSORED RESEARCH OR DEVELOPMENT

This invention was made with government support under Contract No. DE-EE0003258 awarded by the United States Department of Energy. The government has certain rights in this invention.

TECHNICAL FIELD OF INVENTION

The present invention relates to a control valve; more particularly to a control valve which controls flow through a first fluid passage and a second fluid passage; and even more particularly to such a control valve where the second fluid passage extends into the first fluid passage and a valve plate is pivotal within the first fluid passage to control flow through the first fluid passage and the second fluid passage.

BACKGROUND OF INVENTION

A fluid stream from a fluid source may need to be divided and sent to first and second fluid destinations in variable proportions. In one example, a stream of air to be supplied to combustion chambers of an internal combustion engine may be divided in order to achieve a desired temperature of the air being supplied to the combustion chambers. More specifically, a first portion of the stream of air may be passed through a heating or cooling device prior to entering the combustion chambers while a second portion of the stream of air may be passed directly to the combustion chambers. A control valve is used to vary the proportions of the first and the second portions of the stream of air. The combination of the first and second portions of the stream of air, downstream of the heating or cooling device, results in air of a desired temperature that is conducive of desired combustion by the internal combustion engine. In another example, exhaust gases produced by the combustion process of an internal combustion engine may be recirculated back to the combustion chambers in order to achieve desired operating characteristics of the internal combustion engine. The exhaust gases as produced by the internal combustion engine may be too high in temperature to be satisfactory to be communicated directly to the combustion chambers. Consequently, a heat exchanger may be provided to cool the exhaust gases prior to being communicated to the combustion chambers. The exhaust gases may be divided into a first portion which passes through the heat exchanger and a second portion which bypasses the heat exchanger. A control valve is used to vary the proportions of the first and the second portions of the exhaust gases. After passing through the heat exchanger, the first portion is combined with the second portion, the combination of which results in a temperature of the exhaust gases that is conducive of desired combustion by the internal combustion engine. Other examples exist of dividing a flow stream with a control valve that varies the proportions between the first and second portions of the flow stream. In many cases, there may be a high dynamic flow range, i.e. there is a significant difference in the minimum and maximum flow of the flow stream that needs to be divided; and consequently, it may be difficult for a control valve to accommodate the dynamic flow range without inducing parasitic losses. United States Patent Application Publication No. US 2009/0007978 A1 to Alston et al. and U.S. Pat. No. 6,484,703 to Bailey illustrate examples of known valves for dividing a flow stream; however, the valves can be large and difficult to package in addition to experiencing the shortcomings already mentioned.

What is needed is a control valve which minimizes or eliminates one or more of the shortcomings as set forth above.

SUMMARY OF THE INVENTION

Briefly described, a control valve is provided which includes a first fluid conduit having a first fluid conduit inlet and a first fluid conduit outlet, the first fluid conduit defining a first fluid passage from the first fluid conduit inlet to the first fluid conduit outlet; a second fluid conduit having a second fluid conduit inlet and a second fluid conduit outlet, the second fluid conduit extending into the first fluid passage such that the second fluid conduit inlet is located within the first fluid passage, and the second fluid conduit defining a second fluid passage extending from the second fluid conduit inlet to the second fluid conduit outlet; and a valve plate disposed pivotably within the first fluid passage between the first fluid conduit inlet and the first fluid conduit outlet, the valve plate defining a valve plate surface. Pivoting of the valve plate within the first fluid passage varies flow from the first fluid conduit inlet to the first fluid conduit outlet and the valve plate is pivotal between a first position and a second position such that in the first position the valve plate surface covers the second fluid conduit inlet, thereby substantially preventing fluid communication between the first fluid passage and the second fluid passage and such that in the second position the valve plate surface does not cover the second fluid conduit inlet, thereby permitting fluid communication between the first fluid passage and the second fluid passage. The control valve described herein accommodates a high dynamic range of flow and is easily adapted to achieve flow characteristics through the first fluid passage and the second fluid passage by modifying the geometry of the second fluid conduit inlet and the sizes and shapes of the first fluid passage and the second fluid passage.

BRIEF DESCRIPTION OF DRAWINGS

This invention will be further described with reference to the accompanying drawings in which.

DETAILED DESCRIPTION OF INVENTION

Figure 1:
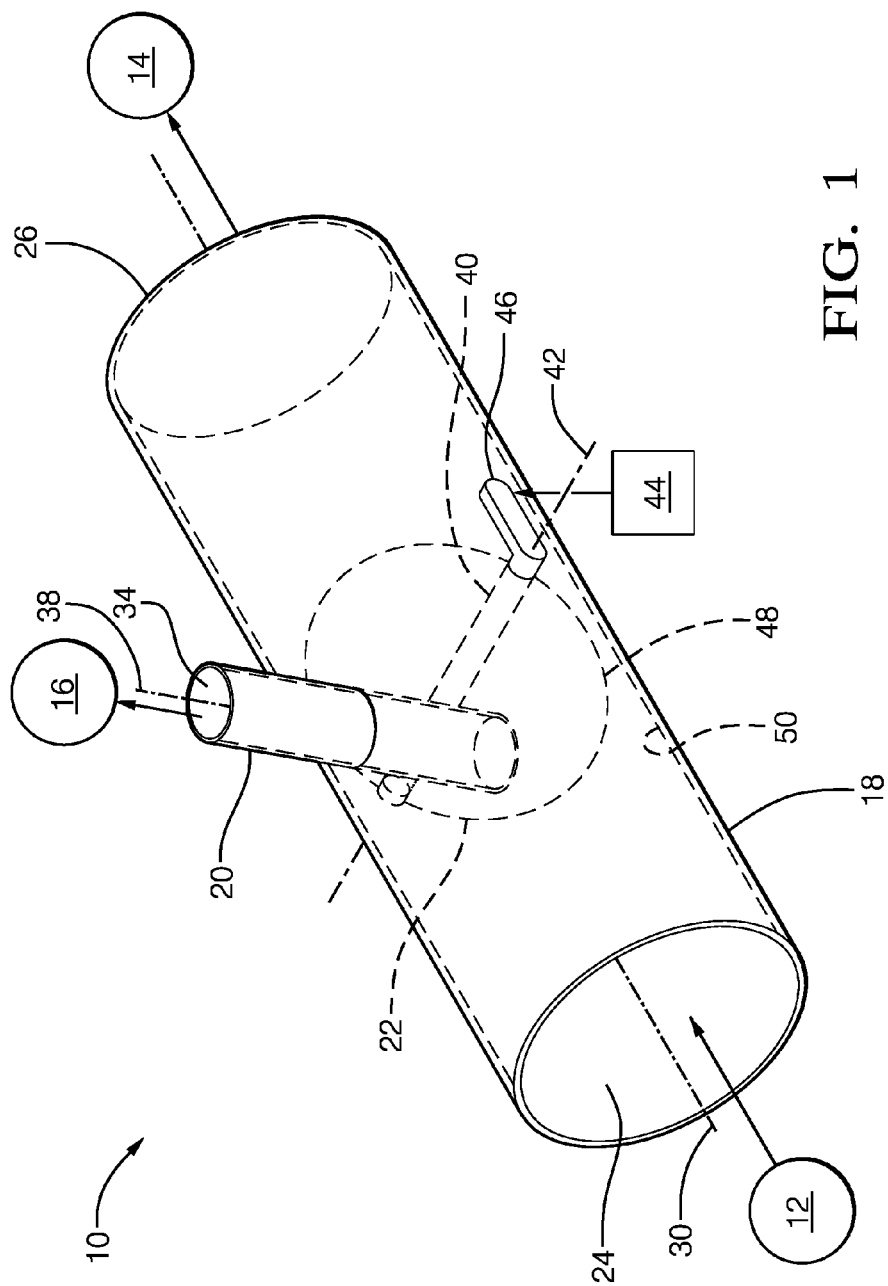
FIG. 1 is a simplified isometric view of a control valve in accordance with the present invention.
Figure 2:
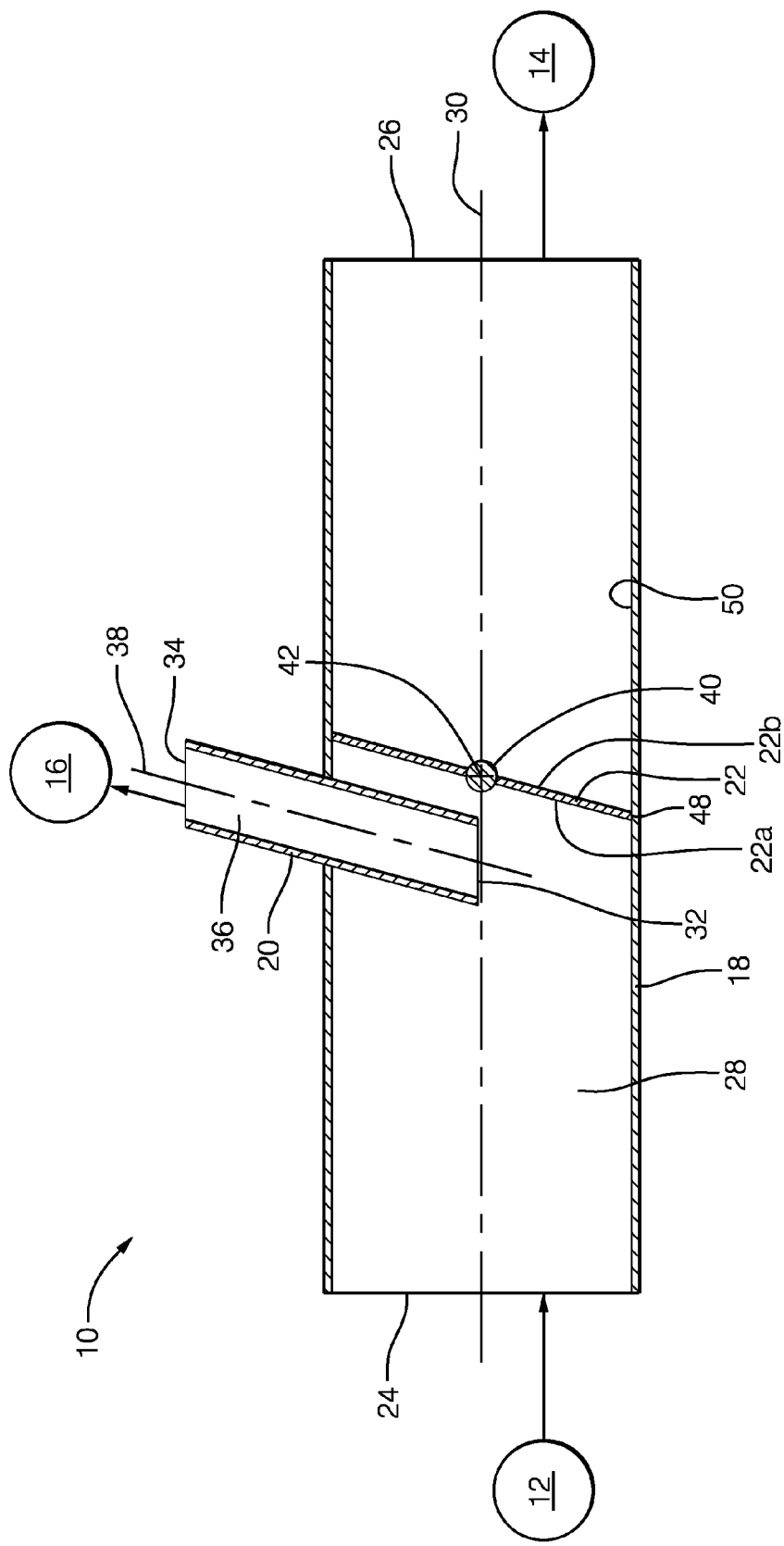
FIG. 2 is an axial cross-sectional view of the control valve of FIG. 1 shown with a valve plate of the control valve in a first position.
Figure 3:
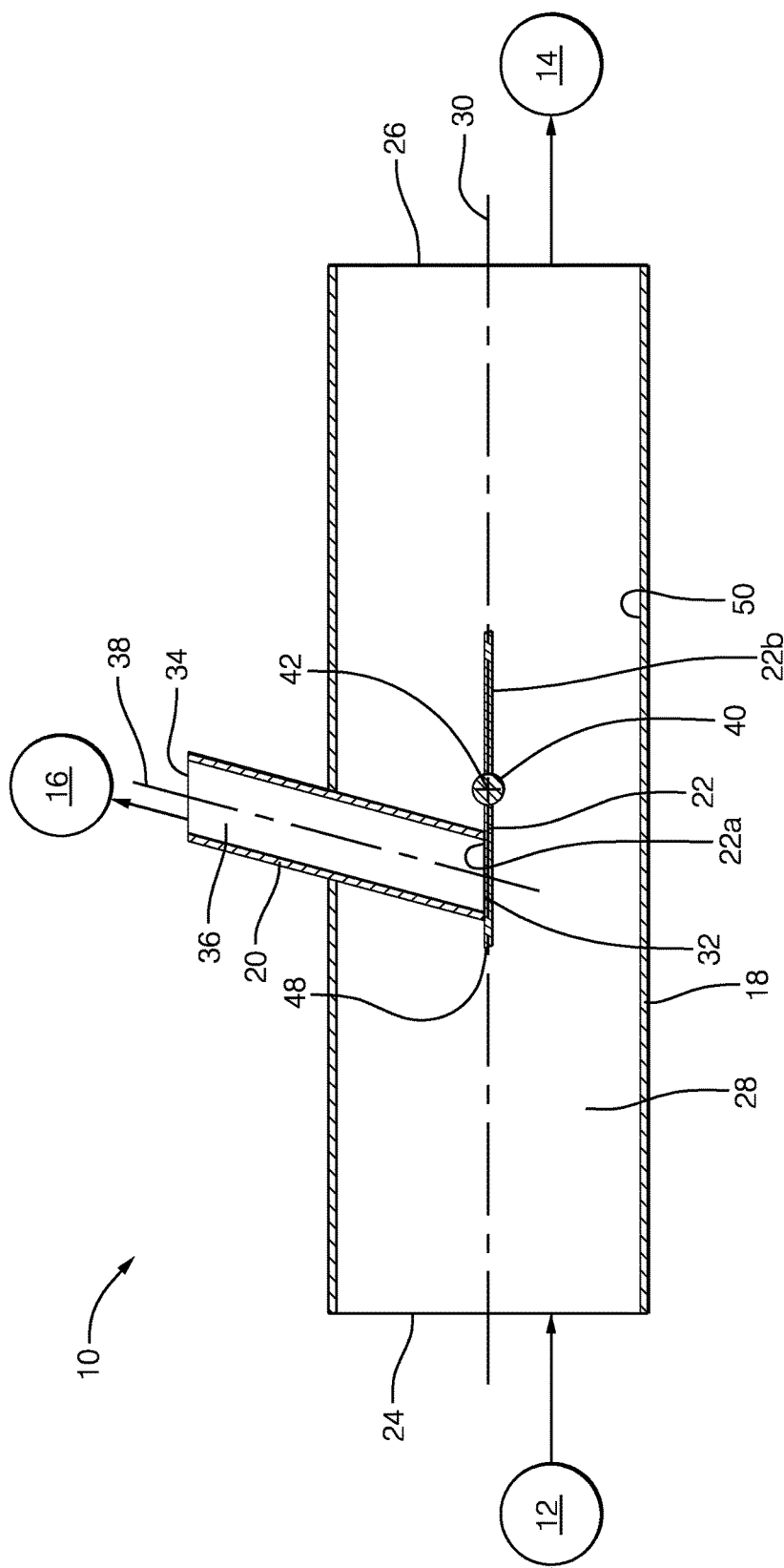
FIG. 3 is the axial cross-sectional view of FIG. 2 now shown with the valve plate in a second position.

In accordance with a preferred embodiment of the present invention and referring to FIGS. 1-3, a control valve 10 is shown which controls flow of a fluid between a fluid source 12 and a first fluid destination 14 and also between fluid source 12 and a second fluid destination 16. Control valve 10 generally includes a first fluid conduit 18, a second fluid conduit 20, and a valve plate 22 which interacts with first fluid conduit 18 and second fluid conduit 20 in order to control flow of the fluid between fluid source 12 and first fluid destination 14 and also between fluid source 12 and second fluid destination 16. The elements of control valve 10 will be described in greater detail in the paragraphs that follow.

First fluid conduit 18 includes a first fluid conduit inlet 24 which introduces fluid into control valve 10 and a first fluid conduit outlet 26 which discharges fluid from control valve 10. First fluid conduit inlet 24 is configured to receive fluid from fluid source 12 while first fluid conduit outlet 26 is configured to discharge fluid to first fluid destination 14. First fluid conduit 18 defines a first fluid passage 28 extending therethrough along a first fluid passage axis 30 from first fluid conduit inlet 24 to first fluid conduit outlet 26. As illustrated herein, first fluid passage 28 may be circular in radial cross-sectional shape, however, it should now be understood that first fluid passage 28 may be any radial cross-sectional shape and remain within the spirit of the invention.

Second fluid conduit 20 extends into first fluid passage 28 and includes a second fluid conduit inlet 32 such that second fluid conduit inlet 32 is located within first fluid passage 28 and such that second fluid conduit inlet 32 introduces fluid into second fluid conduit 20. Second fluid conduit 20 also includes a second fluid conduit outlet 34 which discharges fluid from second fluid conduit 20. Second fluid conduit inlet 32 is configured to receive fluid from first fluid passage 28 while second fluid conduit outlet 34 is configured to discharge fluid to second fluid destination 16. Second fluid conduit 20 defines a second fluid passage 36 extending therethrough along a second fluid passage axis 38 from second fluid conduit inlet 32 to second fluid conduit outlet 34. It should be noted that second fluid passage 36 is located at least partially within first fluid passage 28 by virtue of second fluid conduit 20 extending into first fluid passage 28. As illustrated herein, second fluid passage 36 may be circular in radial cross-sectional shape, however, it should now be understood that second fluid passage 36 may be any radial cross-sectional shape and remain within the spirit of the invention. Also as illustrated herein, second fluid conduit inlet 32 is oblique to second fluid passage axis 38 and second fluid passage axis 38 is oblique to first fluid passage axis 30, however, it should be noted that it is not essential for second fluid passage axis 38 to be oblique to first fluid passage axis 30 and it is also not essential for second fluid conduit inlet 32 to be oblique to second fluid passage axis 38.

Valve plate 22 is what is commonly referred to as a butterfly valve and is pivotably disposed within first fluid passage 28 between first fluid conduit inlet 24 and first fluid conduit outlet 26. Valve plate 22 includes a valve shaft 40 which extends along a valve shaft axis 42 which may be substantially perpendicular to first fluid passage axis 30. Valve shaft axis 42 may preferably pass through first fluid passage axis 30 which results in the force of the fluid within first fluid passage 28 acting on valve plate 22 to be balanced, thereby minimizing the tendency for the fluid to apply a net torque to valve plate 22 that would tend to rotate valve plate 22 about valve shaft axis 42. Valve shaft 40 pivots together with valve plate 22 such that opposing ends of valve shaft 40 extend through the wall of first fluid conduit 18. In this way, valve shaft 40 and valve plate 22 are supported by first fluid conduit 18 at opposing ends of valve shaft 40. Valve shaft 40, and consequently valve plate 22, is pivoted about valve shaft axis 42 by an actuator 44 which is connected to valve shaft 40 through linkage 46. Alternatively, actuator 44 may directly rotate valve shaft 40, thereby eliminating the need for linkage 46.

Valve plate 22 has a first valve plate surface 22a and an opposing second valve plate surface 22b such that first valve plate surface 22a may be substantially parallel to second valve plate surface 22b. Valve plate 22 defines a valve plate outer perimeter 48 which closely matches a first fluid conduit inner perimeter 50 of first fluid conduit 18 when valve plate 22 is in a closed position which substantially prevents fluid communication between first fluid conduit inlet 24 and first fluid conduit outlet 26 as shown in FIG. 2. It should be understood that some leakage past valve plate 22 within acceptable limits may be permitted while remaining within the scope of substantially preventing fluid communication between first fluid conduit inlet 24 and first fluid conduit outlet 26 as used herein. As shown in FIG. 2, valve plate 22 may be oblique to first fluid passage axis 30 when valve plate 22 is positioned to prevent fluid communication between first fluid conduit inlet 24 and first fluid conduit outlet 26, consequently, valve plate outer perimeter 48 may be elliptical in shape in order to match first fluid conduit inner perimeter 50. Also as shown in FIG. 2, first fluid conduit 18 acts as a first stop which limits the extent to which valve plate 22 is permitted to pivot in a first direction, which as shown in FIG. 2 may be counterclockwise. Alternatively, valve plate 22 may be substantially perpendicular to first fluid passage axis 30 when valve plate 22 is positioned to prevent fluid communication between first fluid conduit inlet 24 and first fluid conduit outlet 26, consequently, valve plate outer perimeter 48 would be circular in shape if first fluid conduit inner perimeter 50 is circular in shape. However, it should now be understood that the shape of valve plate outer perimeter 48 is dependent upon the shape of first fluid conduit inner perimeter 50 and the angle at which valve plate 22 is relative to first fluid passage axis 30 when valve plate 22 is positioned to prevent fluid communication between first fluid conduit inlet 24 and first fluid conduit outlet 26. As valve plate 22 is rotated clockwise from the position shown in FIG. 2, the area of first fluid passage 28 that is available to flow fluid increases until valve plate 22 is in a full open position as shown in FIG. 3 where valve plate 22 is coincident with first fluid passage axis 30. In this way, pivoting of valve plate 22 varies flow from first fluid conduit inlet 24 to first fluid conduit outlet 26.

In addition to valve plate 22 varying flow from first fluid conduit inlet 24 to first fluid conduit outlet 26, valve plate 22 also varies flow from second fluid conduit inlet 32 to second fluid conduit outlet 34. As can be seen in FIG. 2, valve plate 22 does not restrict flow from first fluid passage 28 to second fluid passage 36 when valve plate 22 is positioned to prevent flow from first fluid conduit inlet 24 to first fluid conduit outlet 26. However, as valve plate 22 is rotated clockwise, valve plate 22 moves toward second fluid conduit inlet 32, thereby allowing a portion of flow from fluid source 12 to pass to first fluid destination 14 and also restricting flow from first fluid passage 28 to second fluid passage 36 at some positions of valve plate 22. When valve plate 22 has rotated sufficiently far clockwise, first valve plate surface 22a comes into contact with second fluid conduit inlet 32, thereby covering second fluid conduit inlet 32 and substantially preventing fluid communication between first fluid passage 28 and second fluid passage 36. It should be understood that some leakage past valve plate 22 within acceptable limits may be permitted while remaining within the scope of substantially preventing fluid communication between first fluid passage 28 and second fluid passage 36 as used herein.

In this way, second fluid conduit 20 acts as a second stop which limits the extent to which valve plate 22 is permitted to pivot in a second direction, which as shown in FIG. 3 may be clockwise, and is opposite in direction from the direction in which first fluid conduit 18 acts as a stop. As can be seen best in FIG. 3, second fluid conduit inlet 32 is substantially parallel to first fluid passage axis 30 and is positioned within first fluid passage 28 to allow first valve plate surface 22a to seal against second fluid conduit inlet 32 when valve plate 22 is positioned to provide minimum restriction to flow through first fluid passage 28.

Figure 4:
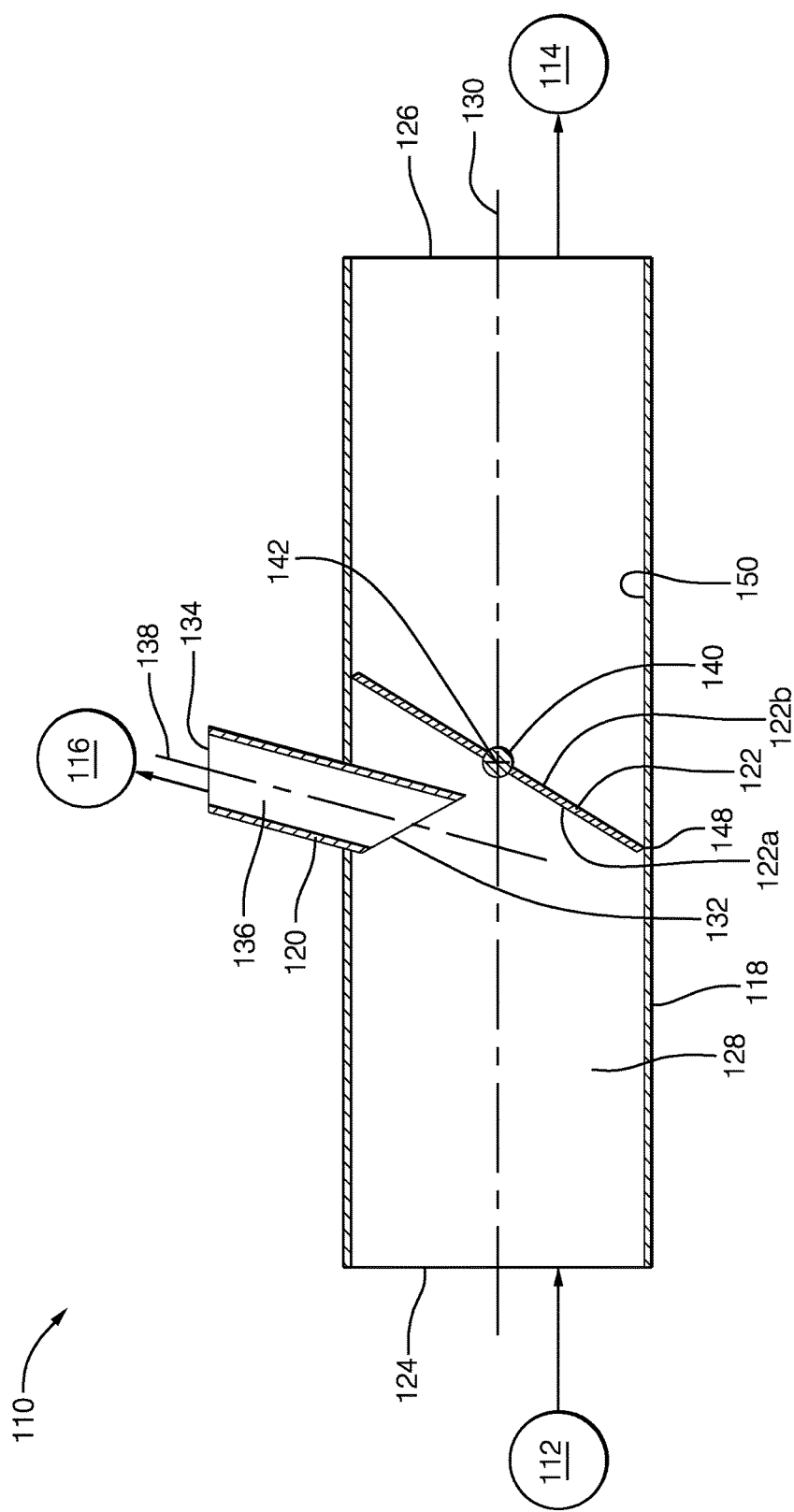
FIG. 4 is an axial cross-sectional view of another control valve in accordance with the present invention showing a valve plate of the control valve in a first position.
Figure 5:
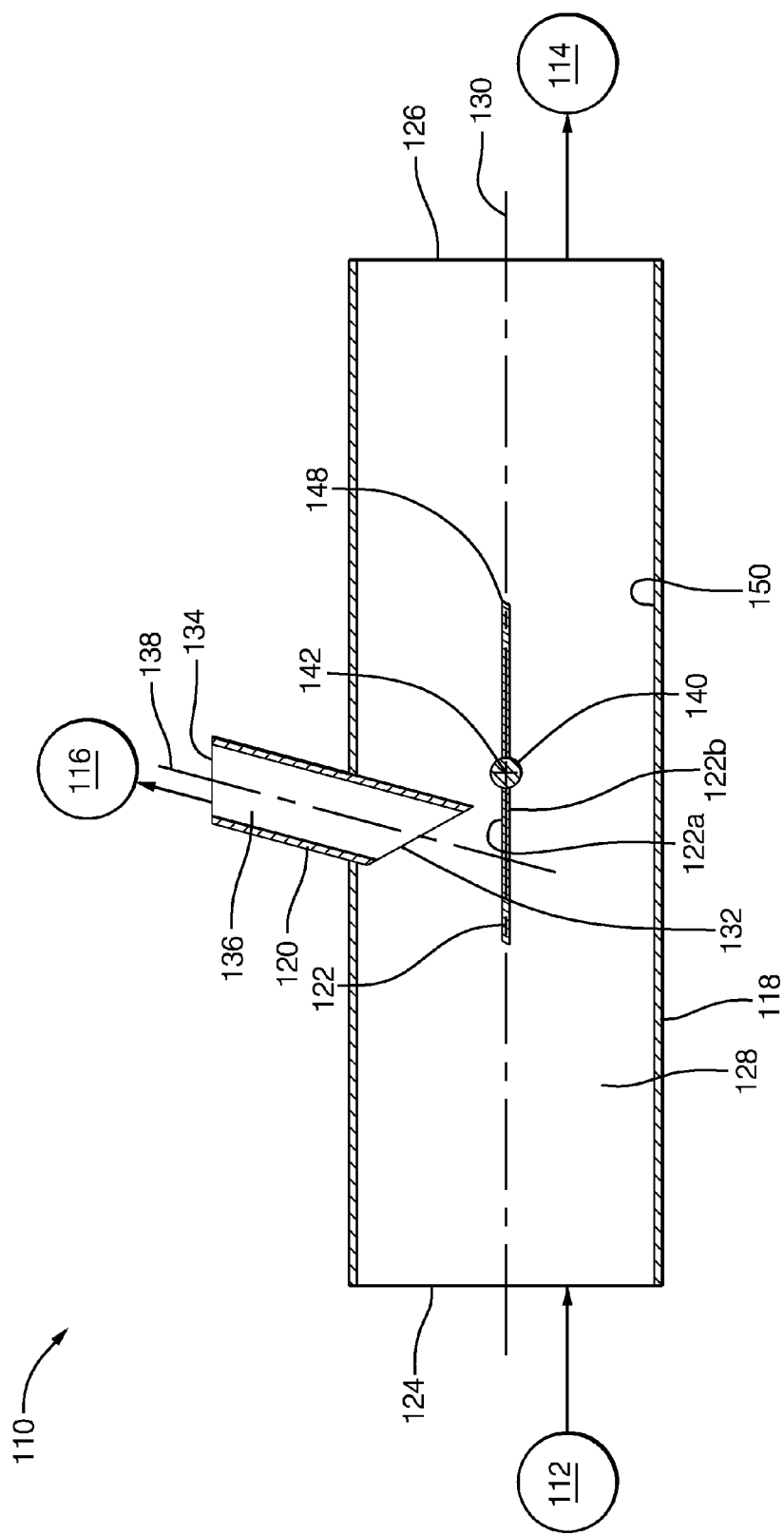
FIG. 5 is the axial cross-sectional view of FIG. 4 now showing the valve plate in a second position.
Figure 6:
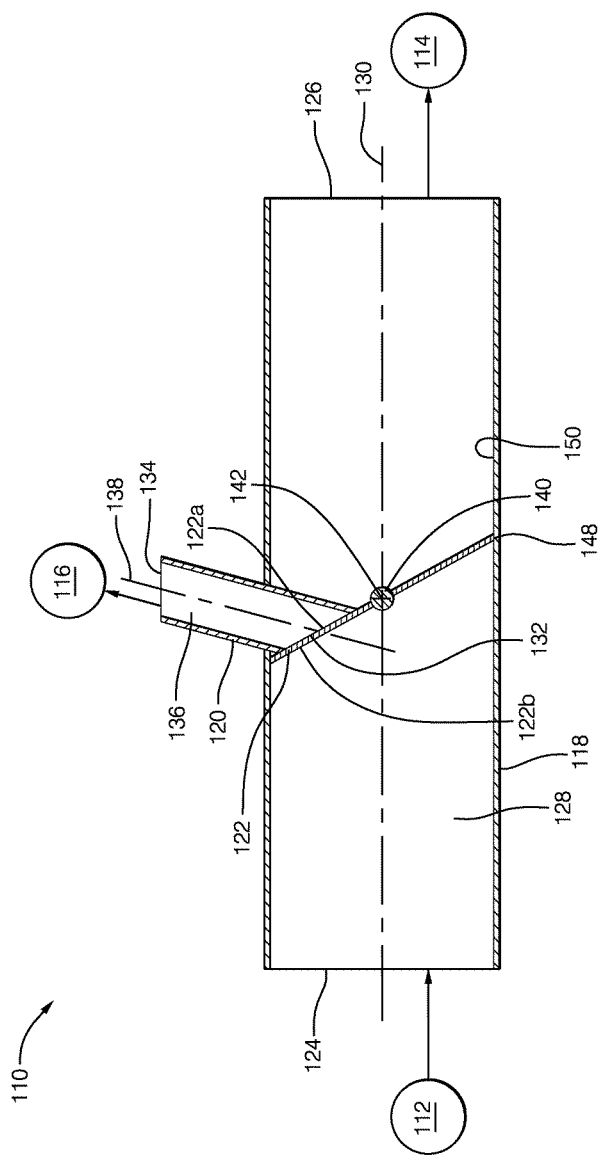
FIG. 6 is the axial cross-sectional view of FIGS. 4 and 5 now showing the valve plate in a third position.

In an alternative embodiment as shown in FIGS. 4-6, a control valve 110 is shown which controls flow of a fluid between a fluid source 112 and a first fluid destination 114 and also between fluid source 112 and a second fluid destination 116. Control valve 110 generally includes a first fluid conduit 118, a second fluid conduit 120, and a valve plate 122 which interacts with first fluid conduit 118 and second fluid conduit 120 in order to control flow of the fluid between fluid source 112 and first fluid destination 114 and also between fluid source 112 and second fluid destination 116. The elements of control valve 110 will be described in greater detail in the paragraphs that follow.

First fluid conduit 118 includes a first fluid conduit inlet 124 which introduces fluid into control valve 110 and a first fluid conduit outlet 126 which discharges fluid from control valve 110. First fluid conduit inlet 124 is configured to receive fluid from fluid source 112 while first fluid conduit outlet 126 is configured to discharge fluid to first fluid destination 114. First fluid conduit 118 defines a first fluid passage 128 extending therethrough along a first fluid passage axis 130 from first fluid conduit inlet 124 to first fluid conduit outlet 126. As illustrated herein, first fluid passage 128 may be circular in radial cross-sectional shape, however, it should now be understood that first fluid passage 128 may be any radial cross-sectional shape and remain within the spirit of the invention.

Second fluid conduit 120 extends into first fluid passage 128 and includes a second fluid conduit inlet 132 such that second fluid conduit inlet 132 is located within first fluid passage 128 and such that second fluid conduit inlet 132 introduces fluid into second fluid conduit 120. Second fluid conduit 120 also includes a second fluid conduit outlet 134 which discharges fluid from second fluid conduit 120. Second fluid conduit inlet 132 is configured to receive fluid from first fluid passage 128 while second fluid conduit outlet 134 is configured to discharge fluid to second fluid destination 116. Second fluid conduit 120 defines a second fluid passage 136 extending therethrough along a second fluid passage axis 138 from second fluid conduit inlet 132 to second fluid conduit outlet 134. It should be noted that second fluid passage 136 is located at least partially within first fluid passage 128 by virtue of second fluid conduit 120 extending into first fluid passage 128. As illustrated herein, second fluid passage 136 may be circular in radial cross-sectional shape, however, it should now be understood that second fluid passage 136 may be any radial cross-sectional shape and remain within the spirit of the invention. Also as illustrated herein second fluid conduit inlet 132 is oblique to second fluid passage axis 138.

Valve plate 122 is what is commonly referred to as a butterfly valve and is pivotably disposed within first fluid passage 128. Valve plate 122 includes a valve shaft 140 which extends along a valve shaft axis 142 which may be substantially perpendicular to first fluid passage axis 130. Valve shaft axis 142 may preferably pass through first fluid passage axis 130 which results in the force of the fluid within first fluid passage 128 acting on valve plate 122 to be balanced, thereby minimizing the tendency for the fluid to apply a net torque to valve plate 122 that would tend to rotate valve plate 122 about valve shaft axis 142. Valve shaft 140 pivots together with valve plate 122 such that opposing ends of first fluid conduit 118 extend through the wall of first fluid conduit 118. In this way, valve shaft 140 is supported by first fluid conduit 118 at opposing ends of valve shaft 140. Valve shaft 140, and consequently valve plate 122, is pivoted about valve shaft axis 142 by an actuator (not show) as describe previously relative to control valve 10.

Valve plate 122 has a first valve plate surface 122a and an opposing second valve plate surface 122b such that first valve plate surface 122a may be substantially parallel to second valve plate surface 122b. Valve plate 122 defines a valve plate outer perimeter 148 which closely matches a first fluid conduit inner perimeter 150 of first fluid conduit 118 when valve plate 122 is in a closed position which substantially prevents fluid communication between first fluid conduit inlet 124 and first fluid conduit outlet 126 as shown in FIGS. 4 and 6. It should be understood that some leakage past valve plate 122 within acceptable limits may be permitted while remaining within the scope of substantially preventing fluid communication between first fluid conduit inlet 124 and first fluid conduit outlet 126 as used herein. As shown in FIGS. 4 and 6, valve plate 122 may be oblique to first fluid passage axis 130 when valve plate 122 is positioned to prevent fluid communication between first fluid conduit inlet 124 and first fluid conduit outlet 126, consequently, valve plate outer perimeter 148 may be elliptical in shape in order to match first fluid conduit inner perimeter 150. However, it should now be understood that the shape of valve plate outer perimeter 148 is dependent upon the shape of first fluid conduit inner perimeter 150 and the angle at which valve plate 122 is relative to first fluid passage axis 130 when valve plate 122 is positioned to prevent fluid communication between first fluid conduit inlet 124 and first fluid conduit outlet 126. Also as shown in FIGS. 4 and 6, first fluid conduit 118 acts as a first stop which limits the extent to which valve plate 122 is permitted to pivot in a first direction, which as shown in FIG. 4 may be counterclockwise. As valve plate 122 is rotated clockwise from the position shown in FIG. 4, the area of first fluid passage 128 that is available to flow fluid increases until valve plate 122 is in a full open position as shown in FIG. 5 where valve plate 122 is coincident with first fluid passage axis 130. In this way, pivoting of valve plate 122 varies flow from first fluid conduit inlet 124 to first fluid conduit outlet 126.

In addition to valve plate 122 varying flow from first fluid conduit inlet 124 to first fluid conduit outlet 126, valve plate 122 also varies flow from second fluid conduit inlet 132 to second fluid conduit outlet 134. As can be seen in FIG. 4, valve plate 122 does not restrict flow from first fluid passage 128 to second fluid passage 136 when valve plate 122 is positioned to prevent flow from first fluid conduit inlet 124 to first fluid conduit outlet 126. However, as valve plate 122 is rotated clockwise, valve plate 122 moves toward second fluid conduit inlet 132, thereby allowing a portion of flow from fluid source 112 to pass to first fluid destination 114 and also restricting flow from first fluid passage 128 to second fluid passage 136 at some positions of valve plate 122. When valve plate 122 has rotated sufficiently far clockwise, first valve plate surface 122a comes into contact with second fluid conduit inlet 132, thereby covering second fluid conduit inlet 132 and substantially preventing fluid communication between first fluid passage 128 and second fluid passage 136. When valve plate 122 has rotated sufficiently far to prevent fluid communication between first fluid passage 128 and second fluid passage 136, valve plate 122 has also rotated sufficiently far to allow valve plate outer perimeter 148 to again engage first fluid conduit inner perimeter 150, thereby substantially preventing fluid communication between first fluid conduit inlet 124 and first fluid conduit outlet 126 as shown in FIG. 6. In this way, first fluid conduit 118 and second fluid conduit 120 act together as a second stop which limits the extent to which valve plate 122 is permitted to pivot in a second direction, which as shown in FIG. 6 may be clockwise, and is opposite in direction from the direction in which first fluid conduit 118 acts alone as a stop. As described herein, control valve 110 allows for first fluid passage 128 and second fluid passage 136 to be simultaneously blocked by valve plate 122, unlike control valve 10 which allows only one of first fluid passage 28 and second fluid passage 36 to be blocked at a time.

Control valve 10 and control valve 110 accommodate a high dynamic range of flow from fluid source 12 and fluid source 112 respectively. Furthermore, second fluid conduit inlet 32 and second fluid conduit inlet 132 can be easily modified by changing the position or angle thereof within first fluid passage 28 and first fluid passage 128 respectively in order to achieve desired flow characteristics of control valve 10 and control valve 110. Other aspects of control valve 10 and control valve 110 can also be easily modified, for example, the size and shape of first fluid passage 28, first fluid passage 128, second fluid passage 36, and second fluid passage 136 in order to achieve desired flow characteristics of control valve 10 and control valve 110.

While this invention has been described in terms of preferred embodiments thereof, it is not intended to be so limited, but rather only to the extent set forth in the claims that follow.

We claim:

1. A control valve comprising:
   a first fluid conduit having a first fluid conduit inlet and a first fluid conduit outlet, said first fluid conduit defining a first fluid passage from said first fluid conduit inlet to said first fluid conduit outlet;
   a second fluid conduit having a second fluid conduit inlet and a second fluid conduit outlet, said second fluid conduit extending into said first fluid passage such that said second fluid conduit inlet is located within said first fluid passage, and said second fluid conduit defining a second fluid passage extending from said second fluid conduit inlet to said second fluid conduit outlet; and
   a valve plate disposed pivotably within said first fluid passage between said first fluid conduit inlet and said first fluid conduit outlet, said valve plate defining a valve plate surface;
   wherein pivoting of said valve plate within said first fluid passage varies flow from said first fluid conduit inlet to said first fluid conduit outlet; and
   wherein said valve plate is pivotal between a first position and a second position such that in said first position said valve plate surface covers said second fluid conduit inlet, thereby substantially preventing fluid communication between said first fluid passage and said second fluid passage and such that in said second position said valve plate surface does not cover said second fluid conduit inlet, thereby permitting fluid communication between said first fluid passage and said second fluid passage;
   wherein said valve plate is configured to block said first fluid passage when said valve plate is pivoted to said first position, thereby substantially preventing fluid communication between said first fluid conduit inlet and said first fluid conduit outlet; and
   wherein said valve plate is configured to block said first fluid passage when said valve plate is pivoted to said second position, thereby substantially preventing fluid communication between said first fluid conduit inlet and said first fluid conduit outlet.

2. A control valve as in claim 1 wherein:
   said valve plate is pivotal to a third position in which said valve plate permits fluid communication between said first fluid conduit inlet and said first fluid conduit outlet and also permits fluid communication between said first fluid passage and said second fluid passage.

* * * * *